United States Patent [19]

Yamane et al.

[11] Patent Number: 5,450,435
[45] Date of Patent: Sep. 12, 1995

[54] GAS LASER OSCILLATOR

[75] Inventors: Shigeki Yamane, Kobe; Tsutomu Sugiyama, Osaka; Masashi Ohnishi, Takarazuka; Yoshimitsu Matsumoto, Kawabe, all of Japan

[73] Assignee: Matsushita Electric Industrial Co., Ltd., Kadoma, Japan

[21] Appl. No.: 115,780

[22] Filed: Sep. 3, 1993

[30] Foreign Application Priority Data

Sep. 14, 1992 [JP] Japan ................... 4-244424

[51] Int. Cl.⁶ .............................................. H01S 3/22
[52] U.S. Cl. ........................................ 372/58; 372/82; 372/55; 372/61
[58] Field of Search ................ 372/58, 81, 82, 61, 372/55

[56] References Cited

U.S. PATENT DOCUMENTS

| | | | |
|---|---|---|---|
| 4,500,998 | 2/1985 | Kuwabara et al. | 372/58 |
| 4,573,162 | 2/1986 | Bakowsky et al. | 372/61 |
| 4,612,646 | 9/1986 | Zerr | 372/58 |
| 4,672,621 | 6/1987 | Morita et al. | 372/58 |
| 4,771,436 | 9/1988 | Koseki | 372/58 |
| 4,780,881 | 10/1988 | Zhang et al. | 372/81 |
| 4,823,355 | 4/1989 | Koseki | 372/58 |
| 4,993,037 | 2/1991 | Koseki | 372/58 |
| 5,008,896 | 4/1991 | Martinen et al. | 372/82 |
| 5,140,606 | 8/1992 | Yarbourough et al. | 372/82 |
| 5,268,919 | 12/1993 | Hongu et al. | 372/61 |

FOREIGN PATENT DOCUMENTS

| | | |
|---|---|---|
| 1-21635 | 4/1989 | Japan . |
| 1-173771 | 7/1989 | Japan . |
| 3-123089 | 5/1991 | Japan . |

*Primary Examiner*—Leon Scott, Jr.
*Attorney, Agent, or Firm*—Cushman, Darby & Cushman

[57] ABSTRACT

In a high velocity gas laser oscillator of radio frequency or microwave exciting type, both end parts of the discharge tube are provided with gas flow rectifiers for making an inward flowing whirlwind at the discharge region of the discharge tube by blowing the discharge gas through plural slits located in a plane disposed at a predetermined angle with respect to a plane including axis of the discharge tube, wherein microwave power is applied to the discharge tube so as to define an annular discharge region in the discharge tube.

7 Claims, 9 Drawing Sheets

| Oscillation frequency | (A) 13.56 MHz (Radio freq.) | (B) 2.45 GHz (Microwave) |
|---|---|---|
| Discharge state |  |  |
| Beam shape (Burn pattern) |  | |

| Oscillation frequency | (A) 13.56 MHz (Radio freq.) | (B) 2.45 GHz (Microwave) | (C) DC discharge by internal electrodes |
|---|---|---|---|
| Small signal gain distribution | | | |
| Small signal gain distribution | | | |
| Beam shape (Burn pattern) | | | |

GAS LASER OSCILLATOR

FIELD OF THE INVENTION AND RELATED ART STATEMENT

1. Field of the Invention

The present invention relates to a gas laser oscillator. More particularly, the present invention relates to a gas laser oscillator wherein its optical axis coincides with the axis of a discharge tube and which is particularly suitable for a high power and good beam mode.

2. Description of the Related Art

Figure 7:
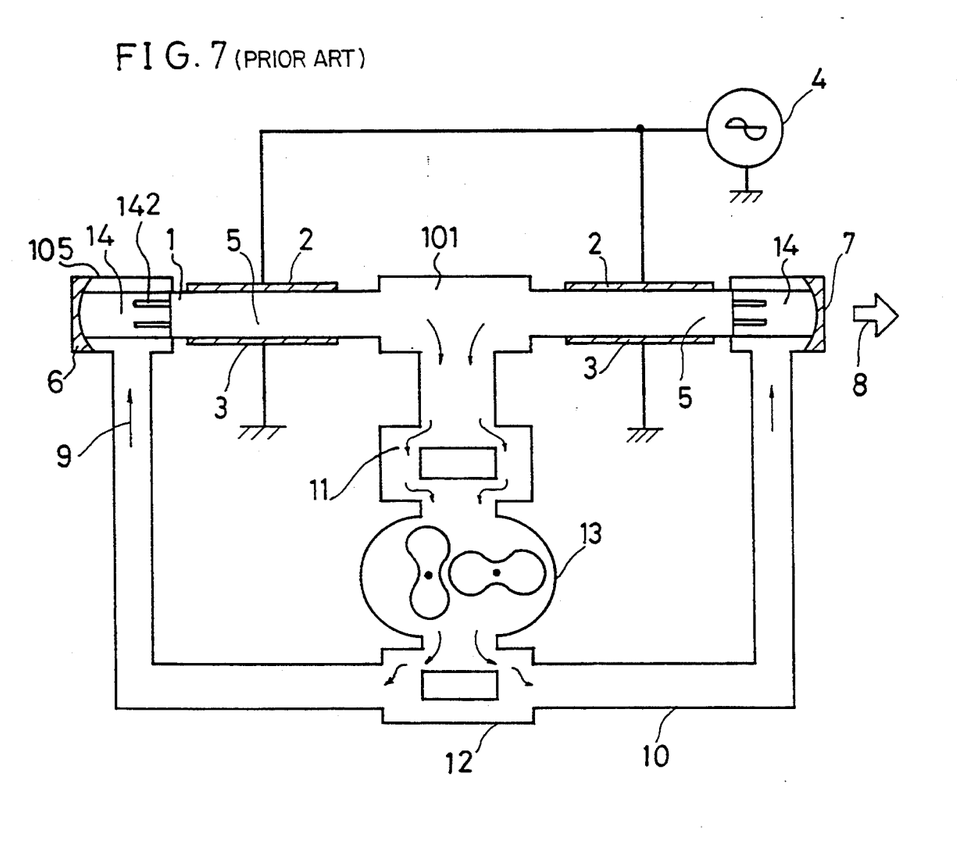
FIG. 7 is a schematical block diagram of a typical conventional $CO_2$ gas laser oscillator.

In recent years, high power gas laser oscillators with large output have become widely used, and are being used for working materials of high hardness and high melting temperature such as metal and ceramic. As one example of the conventional gas laser oscillator system, a high velocity axial flow $CO_2$ gas laser oscillator is shown in FIG. 7. The laser oscillator of FIG. 7 comprises a discharge tube 1, such as glass or the like dielectric material, a reflector 6 disposed at one end of the discharge tube 1, a partial reflector 7 disposed at the other end of the discharge tube 1, two pairs of electrodes 2, 3 and 2', 3', located outside and at respective end parts of the discharge tube 1, a radio frequency or microwave oscillator 4 connected to feed radio frequency power or microwave power across the electrodes 2, 3 and 2', 3', a gas circulation system 10, which comprises a gas circulation blower 13 and a first heat exchanger 11 disposed in a part of the circulation pipe which is between the central part 101 of the discharge tube 1, the blower 13 and a second heat exchanger 12 disposed in the gas circulation pipe immediately down stream of the blower 13.

In the above-mentioned configuration, the operation is as follows.

Radio frequency power or microwave power is fed from the oscillator 4 across the electrodes 2, 3 and 2', 3' to apply an electromagnetic field of radio frequency or microwave in a direction perpendicular to the optical axis of the laser oscillator, so that glow discharges are generated in discharge areas between each respective pair of electrodes 2, 3 and 2', 3'. The laser gas passing through the respective discharge area 5, 5' are excited by obtaining energy from the discharge, and the laser gas becomes to a resonation state in an optical resonator formed by the reflector 6 and the partial reflector 7. Accordingly, the laser oscillation is generated in the optical resonator formed in the discharge tube 1, and the generated laser beam 8 is output through the partial reflector 7.

As a method for taking out a high power in the conventional laser oscillator as shown in FIG. 7, there has been a way of adopting a large inner diameter of the discharge tube 1, to obtain a laser beam 8 of a large diameter. For the conventional radio frequency power source, its frequency is mainly 27.12 MHz or below in accordance with the regulation. State of discharge (namely the scope of discharge) in the discharge regions 5 and 5', which is obtained by applying the radio frequency electric field across the electrodes 2, 3 and 2', 3' in a direction perpendicular to the optical axis, varies depending on the conditions of the inner diameter of the discharge tube 1 or thickness of the discharge tube 1 or length and curvature diameter of the electrodes. When the inner diameter of the discharge tube 1 is increased, the discharges are concentrated in a narrow region 5$a$ defined as narrow regions which are between the two opposing electrodes 2, 3 and 2', 3', respectively, in the discharge regions 5, 5'see FIG. 8. Furthermore, there is as another conventional electrode configuration, which has a pair of ring-shaped electrodes (not shown), whereto radio frequency or microwave power is to be applied at respective ends of the discharge tube or a microwave power of 500 MHz or above is applied through a wave guide in a manner that its microwave electric field is perpendicular to the optical axis of the discharge tube to obtain discharging. However the above-mentioned prior arts devices do not give satisfactory results. For instance, FIG. 9 shows discharge state under such microwave application at the discharge region. As shown in FIG. 9, as a result of skin effect of the microwave, the discharge is made only in the ring shaped region 5$b$ which is only adjacent to the inner wall of the discharge tube 1.

Figure 8:
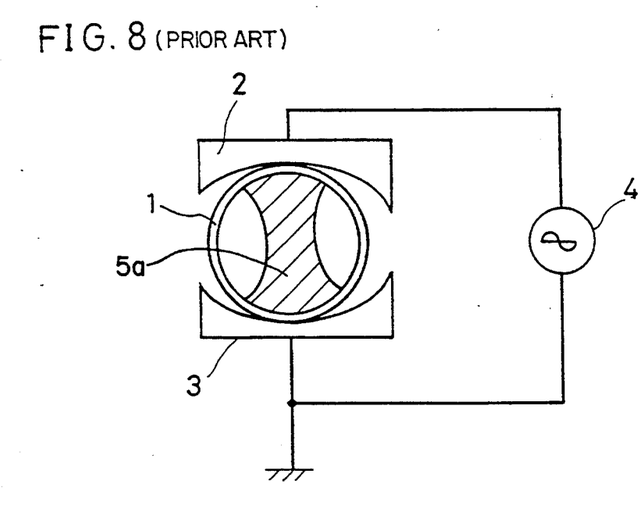
FIG. 8 is a cross-sectional view showing a mode of the discharge region 5 of the discharge tube excited by radio frequency power.
Figure 9:
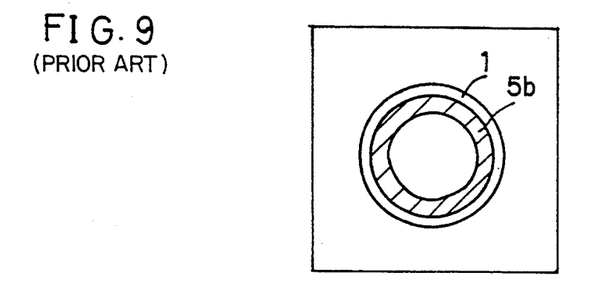
FIG. 9 is the cross-sectional view of another conventional $CO_2$ gas laser oscillator excited by microwave power.
Figure 10:
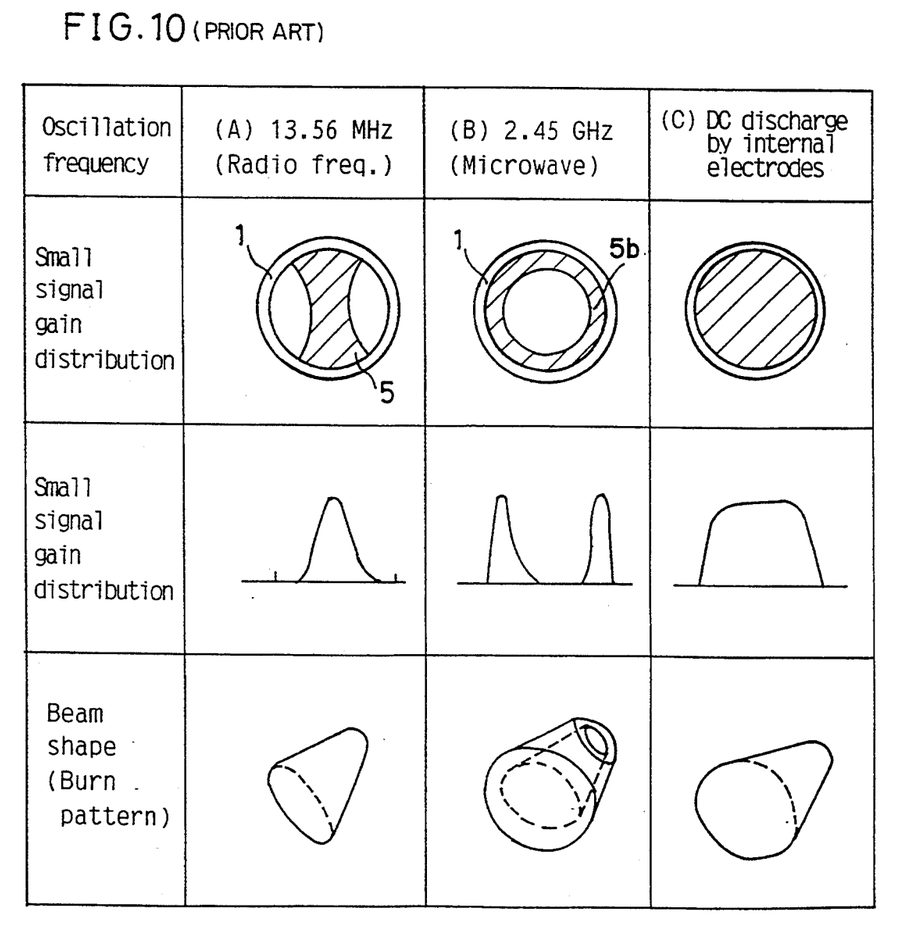
FIG. 10 is a chart schematically showing discharge state, small signal gain distribution, and beam shape for various type of the conventional laser beam oscillator.

FIG. 10 shows relations of discharge states, small signal gain distributions and beam shape for three states of dischargings, namely (A) discharge of FIG. 8, (B) discharge of FIG. 9 and (C) discharge in the whole area in case of DC. As shown in FIG. 10, the small signal gain distribution and beam shape i.e. burn pattern are influenced by the state of the discharge.

The output laser beam 8 (FIG. 7) is converged and used for laser working, etc., and an even discharge shown by (C) in FIG. 10, which has the small signal gain distribution is almost in Gauss mode, is most desirable. However, in actual working, the mode shape is liable to become in non-even shape as shown in the discharge state of (A) or (B). When cutting or the like working is made by using such uneven mode beam, there arises undesirable problems of directivity in the cutting work in case of the discharge state (A) or poor convergence of laser beam in the case of discharge state (B).

Figure 11:
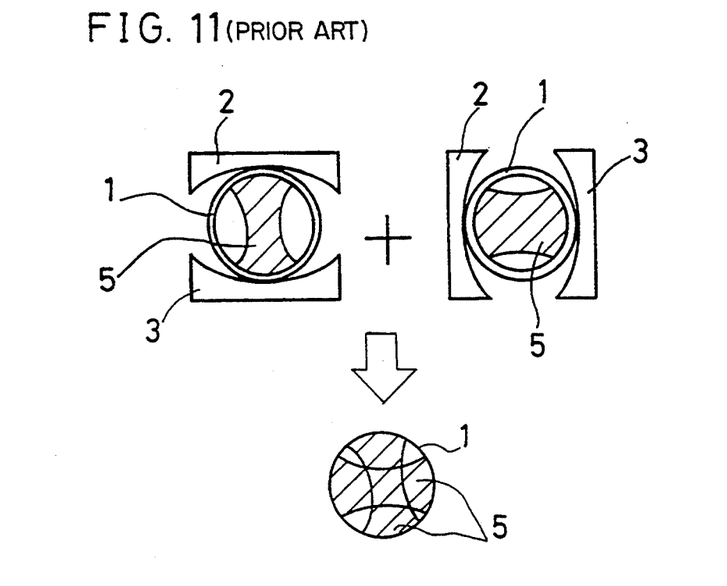
FIG. 11 is a schematic cross-sectional view showing one conventional way of obtaining an improved discharge state by changing electrode disposition of the conventional laser oscillator shown in FIG. 7 and FIG. 8.
Figure 12:
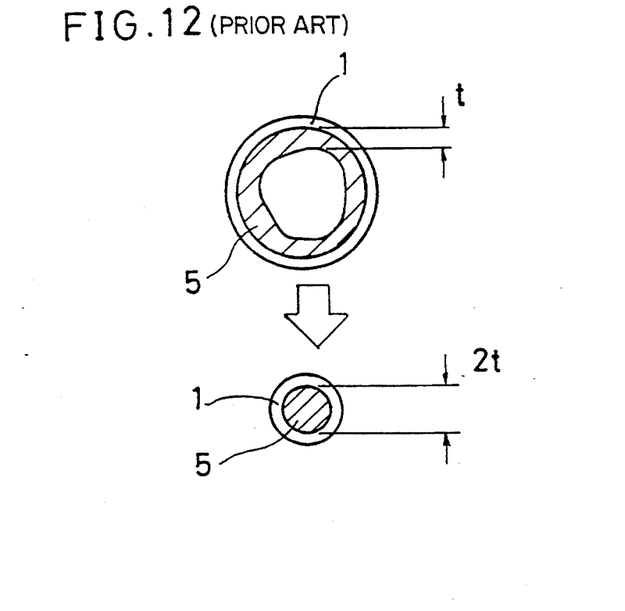
FIG. 12 is a schematic cross-sectional view of another conventional way of obtaining an improved discharge state by decreasing diameter of the discharge tube to a value which is no larger than twice the thickness of the skin effect region in the discharge tube.

In the known DC discharge of the laser, the discharge generally expands in the whole discharge area easily and there is no need of making a particular endeavor. However the DC discharge gas laser has used less recently, because its electrodes consumption requires periodical maintenances. Therefore recently, the radio frequency or microwave laser oscillator have become widely used. In such radio frequency or microwave laser oscillation, however it is generally difficult to expand the discharge area into the whole space of the section of the discharge tube. Accordingly, there are such trials proposed as shown in FIG. 11 wherein plural electrode pairs are combined so as to obtain more even discharge area in the discharge tube 1, and as shown in FIG. 12 wherein a small diameter discharge tube having a small diameter 2t which is only as large as twice of thickness t of the discharge area in discharge tube so as to eliminate the non-discharge area. However, such conventional configurations still have the respective problems of complication of configuration and operation and shorter life of the discharge tube due to concentration of discharge in small diameter area.

Another prior art DE P8706780.8, which is a priority base for U.S. Pat. No. 4,780,881, shows a configuration of blowing a discharging gas from a single large diameter gas blowing pipe which is disposed in tangential relation to the circular section of the discharge tube. However, this prior art does not suggest elimination of the non-discharge area in the circular cross-section of the discharge tube.

Furthermore, as shown in the Japanese published patent application Hei 3-123089 (Tokkai Sho 3-123089), by generating a turbulence of discharge gas to be put into the discharge tube, an increase of radio frequency power was achieved. However, this turbulence did not give good mode of laser beam probably because of inner wall ridges.

Furthermore, in the DC discharge type gas laser oscillator, there has been a proposal to flow the discharge gas in a helical pattern to prevent undesirable generation of discharge arc region, as disclosed in Horiuchi U.S. Pat. No. 4,672,621. However, the above-mentioned Horluchi Patent did not propose improvement of the laser beam mode in the radio frequency or microwave discharge.

In summary, in the radio frequency or microwave high power gas laser oscillator of the prior art, the non-discharge area on the cross-sectional plane of the discharge tube 1, particularly at the central part of the cross-section, can not be eliminated.

The above-mentioned prior art requires particular designs of electrode shape (diameter width and length and gap to the discharge tube) or additional adjustment of electrode shape and radio frequency or microwave oscillator to minimize unevenness of the discharge due to deviation of the electrode disposition and electrode size from the design. Such adjustment requires a long time and skilled labor. Furthermore, decreasing the size of the discharge tube results in poor output power.

OBJECT AND SUMMARY OF THE INVENTION

The present invention purposes to solve the above-mentioned problems, and aims to provide a high power gas laser oscillator with good output beam mode suitable for working by means of an even discharging for any desired diameter of discharge tube, only by using simple-shaped electrode.

According to the configuration of the present invention, by providing the gas in the discharge tube with a velocity vector having a component in a radial direction on a transverse cross-section plane perpendicular to axis of the discharge tube, satisfactory output beam mode of laser is obtainable without need of spreading the discharge in cross section. The improvement of the beam mode of the laser in accordance with the present invention is prominent as the lasing oscillation frequency becomes higher.

The gas laser oscillator in accordance with the present invention comprises:
a discharge tube,
a gas circulation system connected to the discharge tube for circulating a gas in the discharge tube,
means for applying microwave power to the discharge tube to excite the gas,
a reflector provided on one end of the discharge tube,
a partial reflector provided on the end of the discharge tube, and means for providing the gas with a velocity vector having a component in radial direction on a transverse cross-section plane which is perpendicular to axis of the discharge tube, wherein an annular discharge region is defined in the discharge tube.

According to the above-mentioned configuration, by means of the member for providing the gas with a velocity vector having a component in radial direction on a transverse cross-section plane, the laser gas in the discharge region is evenly blended in a manner to eliminate the non-discharge region in a central part on the cross-section, and thereby the small signal gain distribution in the discharge region is made even. Therefore, the discharging in the discharge region in the discharge tube is prevented from undesirable concentration of discharge, and undesirable uneven distribution of the laser energy as in the conventional gas laser oscillator is eliminated. Therefore, the limit of the injection power is drastically increased and hence laser beam of a high power can be stably emitted.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWINGS

FIG. 3($a$) is a sectional view showing a gas flow rectifier 14 used in the first embodiment and the second embodiment;

FIG 3($b$) is a front view of the gas flow rectifier;

FIG. 3($c$) is a sectional view showing in enlarged scale an end chamber 105 at one end of a discharge tube 1;

FIG. 3($d$) is a schematic cross sectional view showing the mode of gas flowing through a gas flow rectifier 14;

FIG. 5($a$) is a graph showing the relation between radical component of gas flow velocity vector and the small signal gain value;

FIG. 5($b$) is a sectional view showing point of measurement of the gas flow velocity;

It will be recognized that some or all of the Figures are schematic representations for purposes of illustration and do not necessarily depict the actual relative sizes or locations of the elements shown.

DESCRIPTION OF THE PREFERRED EMBODIMENTS

Hereafter preferred embodiments of the present invention will be described with reference to FIG. 1 through FIG. 6.

<<FIRST EMBODIMENT>>

Figure 1:
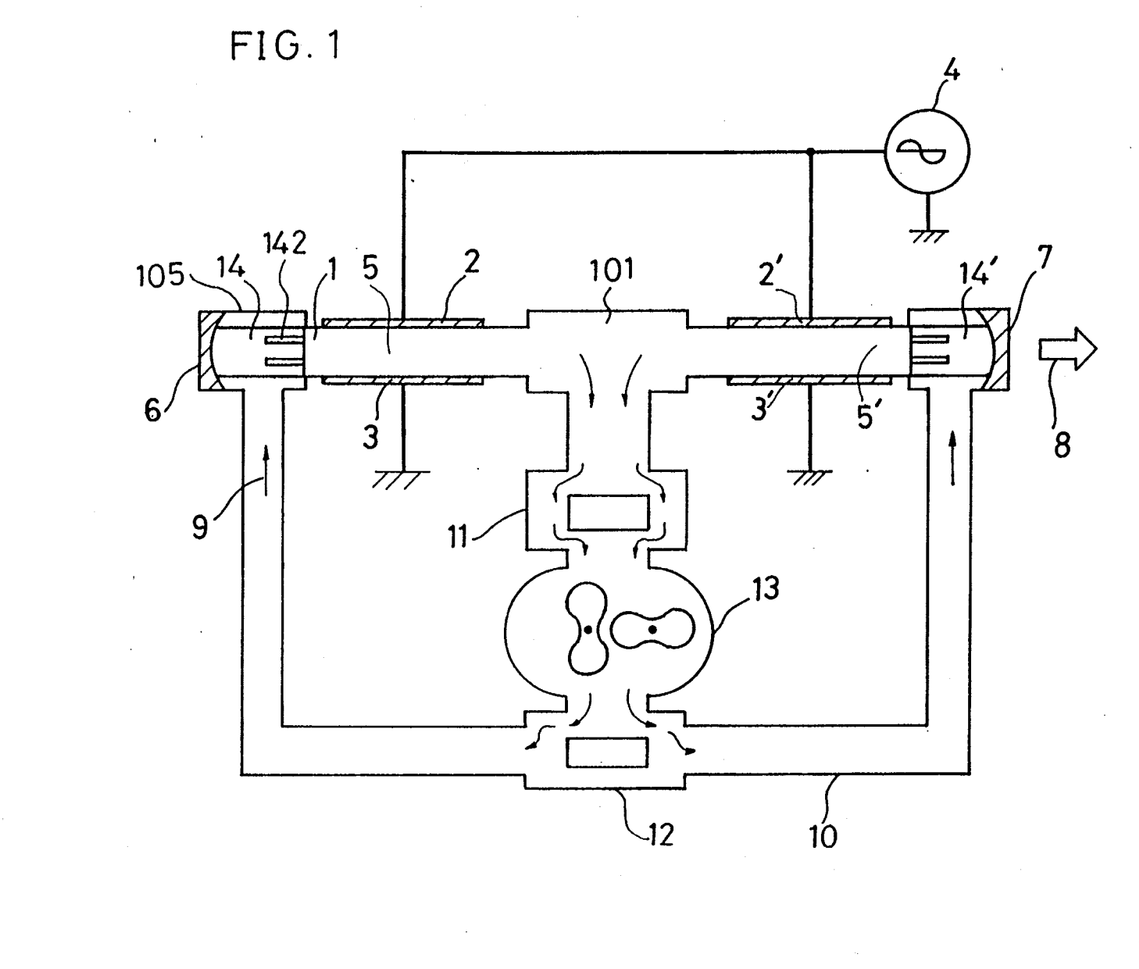
FIG. 1 is a schematic block view of the gas laser oscillator embodying the present invention.

FIG. 1 shows a first preferred embodiment of the present invention wherein the corresponding parts and components are designated with the same reference numerals as the prior art example of FIG. 7.

As a first preferred embodiment of the gas laser oscillator, a high velocity axial flow $CO_2$ gas laser oscillator is shown in FIG. 1. The laser oscillator of FIG. 1 comprises a discharge tube 1 such as of glass, ceramic, quarts or similar heat resistive dielectric material, a reflector 6 disposed at one end of the discharge tube 1, a partial reflector 7 disposed at the other end of the discharge tube 1, two pairs of electrodes 2, 3 and 2', 3', outside and at respective end parts of the discharge tube 1, a radio frequency or microwave oscillator 4 connected to feed radio frequency power or microwave power across the electrodes 2,3 and 2', 3', and a gas circulation system 10 for providing a high velocity gas flow in the discharge tube 1. Further, the oscillator of the present invention has a pair of gas flow-rectifiers 14, which features this radio frequency- or microwave-excited gas laser oscillator, is provided in respective end chambers 105 connected between respective ends of the discharge tube 1 and gas feeding ports of the gas circulation system 10.

Detailed configuration will be elucidated below. The gas circulation system comprises gas circulation pipes, a blower 13, a first heat exchanger 11 disposed in a part of the circulation pipe which is between the central part 101 of the discharge tube 1 and the blower 13 and a second heat exchanger 12 disposed in the circulation pipe immediately down stream of the blower 13.

Figure 3A:
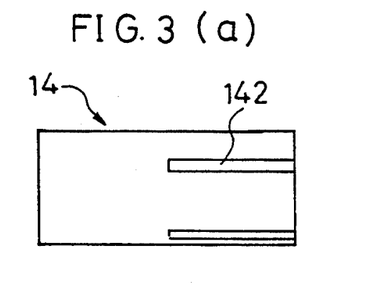
Figure 3B:
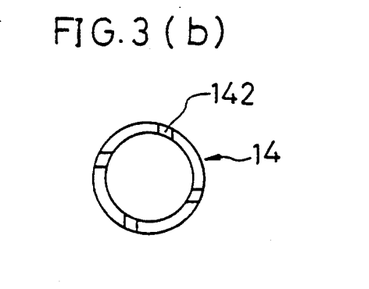
Figure 3C:
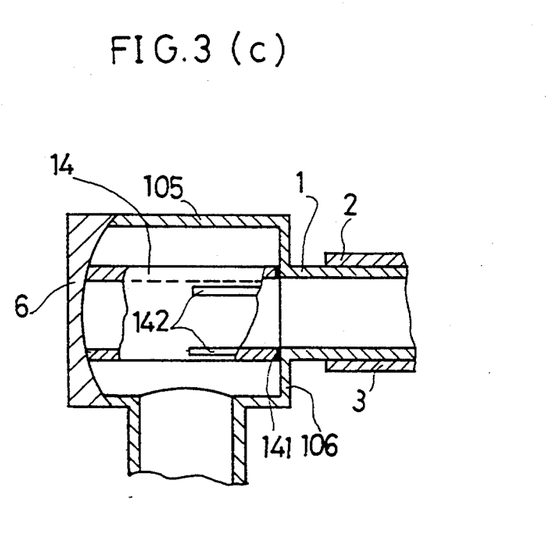

Each of the above-mentioned gas flow rectifier 14 is disposed in the end chamber 105 in a manner as shown in FIG. 3(c). That is, the end chamber 105 is a cup-shaped enclosure made of the same material as that of the discharge tube 1 in a manner continuous with the end of the discharge tube 1 but with a larger diameter than the discharge tube 1. The gas flow rectifier 14 is a pipe of metal or glass as shown in FIG. 3(a), with several slits 142, whose cutting plane is directed to have a predetermined angle on cross-section against a plane including the axis of the discharge tube 1 and the edge of the slit 142, as shown in FIG. 3(b). The distal end of the gas flow rectifier 14 is hermetically connected to the inner wall (i.e., mirror face) of the mirror 6, and the inner end (which is opposite to the distal end), whereat the slits 142 ends, is hermetically connected by welding to the end of the discharge tube 1, or at the connection part of a flange 106 of the end chamber 105 to the end of the tube 1, via a known glass-metal welding layer 141. The other end chamber 105 connected to the partial mirror 7 is configured substantially in the same way as the above-mentioned, except that the partial mirror 7 is connecting to its distal end instead of the mirror 6.

In the above-mentioned configuration, the typical operation is as follows.

Radio frequency power of e.g. 13.56 MHz and 2 kV is applied from the oscillator 4 across the electrodes 2, 3 and 2', 3', thereby to generate an electromagnetic field of radio frequency wave in the direction perpendicular to the optical axis of the laser oscillator. Then glow discharges are generated in discharge areas 5, 5' between respective pair of electrodes 2,3 and 2', 3'. The laser gas passing through the respective discharge areas 5, 5' are excited by obtaining energy from the discharge, and the laser gas comes to a resonation state in an optical resonator formed by the reflector 6 and the partial reflector 7. Laser oscillation is generated in the optical resonator formed in the discharge tube 1, and the generated laser beam 8 is output through the partial reflector 7.

The gas is blown by the blower 13 in a direction, as shown by arrows 9, namely from the blower 13, through a second heat exchanger which cools the temperature of the gas raised as a result of compression by the blower 13, pipe 10, the space in the end chamber 105, the slits 142 of the gas flow rectifier 14 inwards, inside space of the gas flow rectifier 14, discharge region 5 in the discharge tube 1, the central part 101, the first heat exchanger 11 which cools the temperature of the gas raised by the laser oscillation and back to the blower.

Figure 3D:
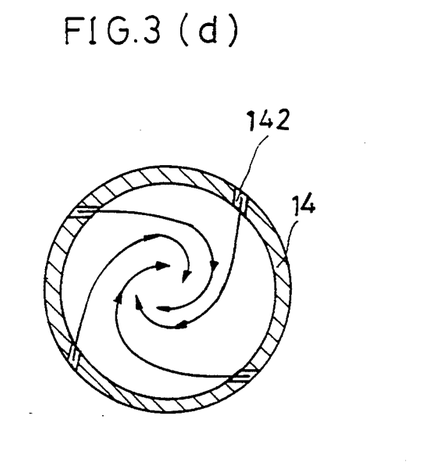

As shown in FIG. 3(b), the gas flow rectifier 14 has plural axial direction slits 142, each of which has a cutting plane that is slanted in a manner so as to have a predetermined angle against a plane which is defined by the axis of the discharge tube 1 and the edge of the slit 142. As a result, the gas which flows through plural slits 142 inwards towards the cylindrical space inside the gas flow rectifier 142 produce an inwards motion as illustrated in FIG. 3(d).

To discuss more to the detail, the gas flows inwards from the end chamber 105 through the plural slits 142 of the gas flow rectifier 14 into the circular inside space therein, and makes an inwards blowing whirlwind as shown in FIG. 3(c), owing to the direction of the cutting plane of the slits 142 which is slanted with respect to the plane including the axis of the discharge tube 1 and the gas flow acquires a velocity vector having a component in a radial direction on the transverse cross-section plane which is perpendicular to the axis of the discharge tube.

According to many experiments carried out by the inventors, the existence of the velocity vector having a component in a radial direction on the transverse cross-section plane makes satisfactory improvements in eliminating the non-discharge area, and hence in achieving the good laser oscillation mode. In other words, the inventors' experiments showed that a simple helical gas flow made by injecting gas flow from an inlet port disposed in a direction which is substantially-tangential to the circular inner wall of the discharge tube, which gives only a simple helical gas flow but does not give the radial direction component of velocity vector, did not give any satisfactory improvement of the laser oscillation mode.

Figure 4:
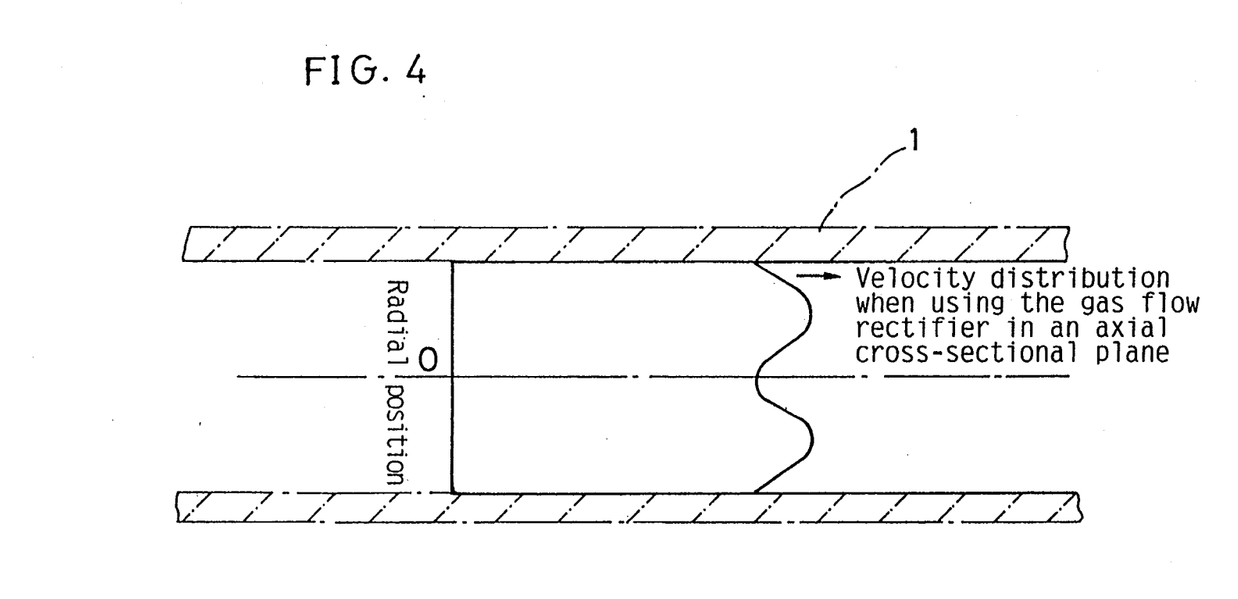
FIG. 4 is a schematic view showing gas flow velocity profile along a diameter of the discharge tube.

FIG. 4 is a schematic diagram showing profile of intensity of the gas velocity when using the gas flow rectifier, with regard to the diametric position along a diameter on a transverse cross-section plane in the embodiment shown by FIG. 1 through FIG. 3(d). As shown in FIG. 4, as a result of adopting the gas flow rectifier 14 of the above-mentioned configuration, a special pattern profile curve of the radial direction component of the velocity vector Vr was obtained apart from the case of exclusion of the gas flow rectifier 14.

Figure 5A:
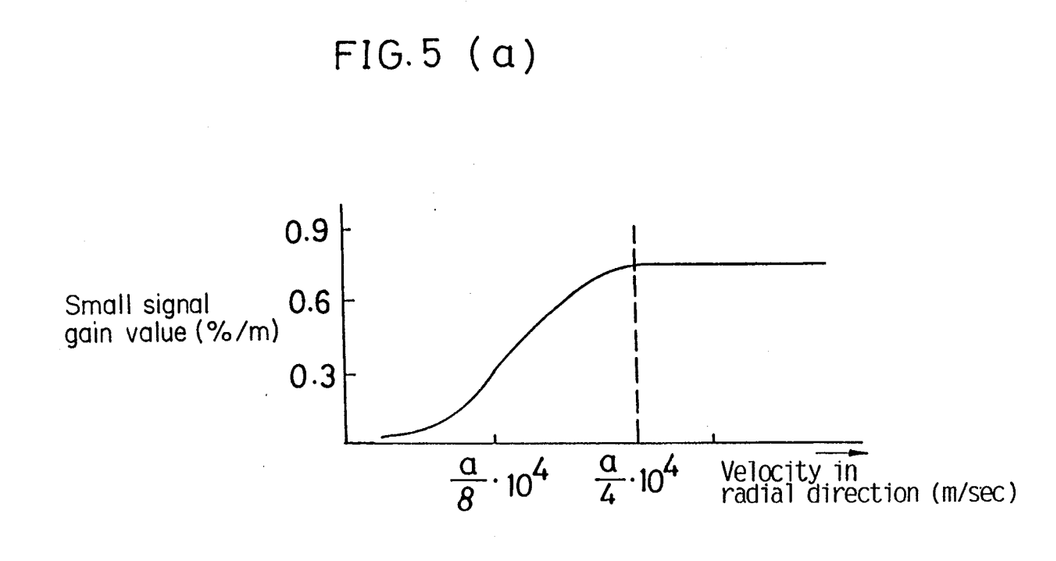
Figure 5B:
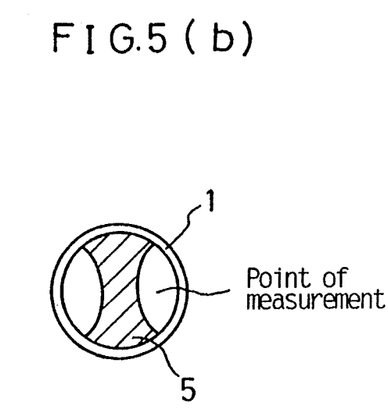
Figure 6:
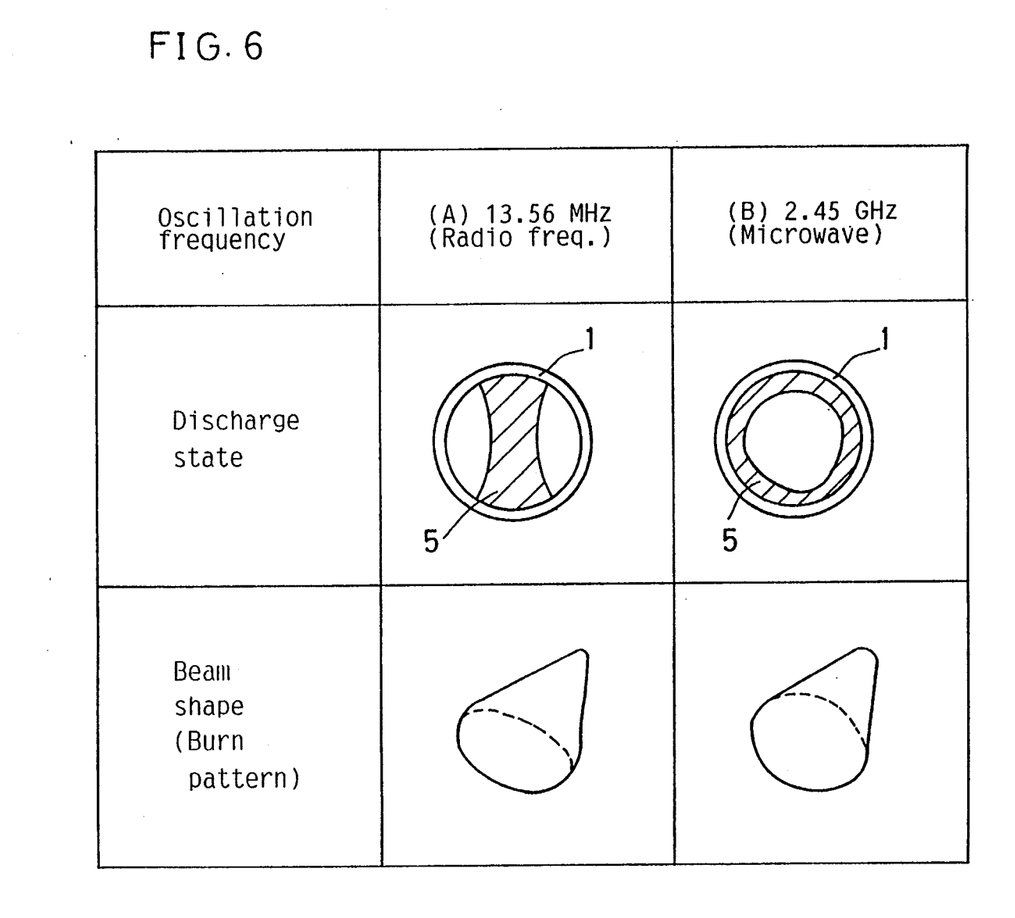
FIG. 6 is a chart schematically showing discharging state and beam shape (burn pattern) for example (A) of radio frequency laser oscillation and for example (B) of microwave laser oscillation.

FIG. 5(a) and FIG. 5(b) show the characteristic relation between the radial direction component of velocity vector (m/sec.) and the small signal gain (in %m). FIG. 5(a) is a graph showing the relation between radical component of gas flow velocity vector and small signal gain value. FIG. 5(b) is a sectional view showing point of measurement of the gas flow velocity. As shown in FIG. 5(b), the discharge area does not spread in the whole cross section of the discharge tube 1. In case the gas velocity has a component in radial direction in the cross section of FIG. 5(b), the small signal gain value distributes in the whole cross section.

The gas flow velocity can be divided into a component of the axial direction and a component in the vertical direction with respect to the axis. Further, the component of the vertical direction (which is the component on a vertical cross-sectional plane which is perpendicular to the optical axis) at a point on the vertical cross-section can be divided into component of radial direction and component in tangential direction on a circle which has a center on the optical axis. And the inventors' experiments and FIG. 5 proved that the component of radial direction is influential to improvement in the small signal gain.

Taking the example of $CO_2$ gas laser oscillator, the relaxation period of natural discharge of $CO_2$ molecules as the laser medium is about 2 m sec.; and it is considered that in the laser resonator the $CO_2$ molecules instantly transit to the lower level owing to a discharge. However, the inventors found that, by diffusing the laser gas within the above-mentioned relaxation period to the places whereto the above-mentioned discharge is not yet expanded, it becomes possible to obtain an even distribution of discharge even in the places where discharges are not made. That is, by providing such a velocity vector component in radial direction as to enable a motion of the discharge gas for a distance in radial direction of about half of the inner diameter of the discharge tube 1 within the time period of from 1 m sec. to 2 m sec., which is the natural relaxation period of $CO_2$, the small signal gain becomes very much even, regardless of distribution of discharge pattern in the discharge tube. And hence the mode of the output laser beam becomes even.

Furthermore, by selecting the velocity vector Vr in the radial direction no larger than the below-mentioned value, the beam mode can be improved in the radio frequency or microwave lasing:

$$Vr \leq D/Tm, \qquad (1),$$

where
D: the inner diameter of the discharge tube,
Trn: the natural relaxation period of excitation level of the laser medium.

Figure 2:
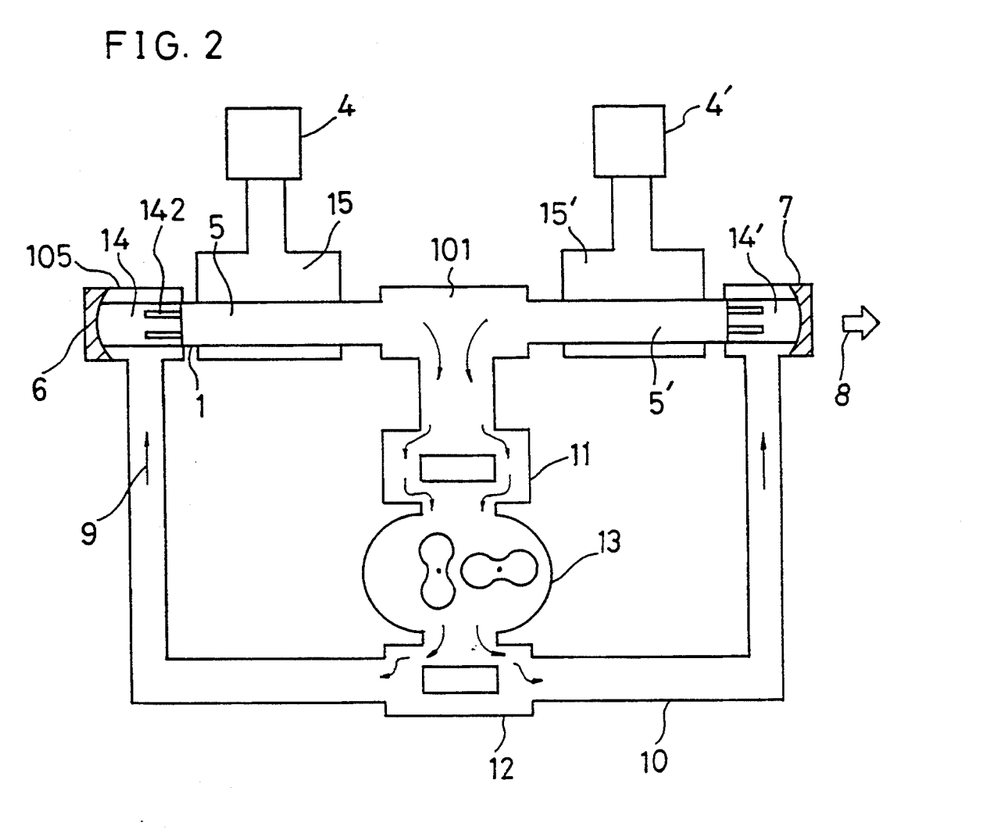
FIG. 2 is a schematic block diagram of a second embodiment of the gas laser oscillator of the present invention.

FIG. 2 shows a second preferred embodiment of the gas laser oscillator system of a high velocity axial flow $CO_2$ gas laser oscillator. The gas laser oscillator of FIG. 2 is fundamentally similar to the gas laser oscillator of FIG. 1 except the way of excitement of the gas.

<<SECOND EMBODIMENT>>

The second embodiment of the gas laser oscillator is a high velocity axial flow $CO_2$ gas laser excited by a microwave power. The laser oscillator of FIG. 2 is microwave excited gas laser oscillator; and it comprises a discharge tube 1 such as of glass, ceramic, quarts or the like heat resistive dielectric material, a reflector 6 disposed at one end of the discharge tube 1, a partial reflector 7 disposed at the other end of the discharge tube 1, a waveguide 15 and 15' coupled to, and in a manner to wrap, the respective end parts of the discharge tube 1, a microwave oscillator 4', connected to feed a microwave power to the discharge region 5, 5', a gas circulation system 10 for providing a high velocity gas flow in the discharge tube 1, and a pair of gas flow-rectifiers 14' provided in respective end chambers 105 connected between respective ends of the discharge tube 1 and gas feeding ports of the gas circulation system 10. The gas circulation system comprises gas circulation pipes, a blower 13, a first heat exchanger 11 disposed in a part of the circulation pipe which is between the central part 101 of the discharge tube 1 and the blower 13 and a second heat exchanger 12 disposed in the circulation pipe at the part immediately down stream side of the blower 13.

Each gas flow rectifier 14 is disposed at the end chamber 105 in the same manner as shown in FIG. 1A.

In the above-mentioned configuration of FIG. 2, the operation is as follows.

Microwave power of e.g. 2.45 GHz or higher frequency from the power supply 4' is applied to the discharge regions 5, 5', and then, glow discharges are generated in discharge areas 5, 5' in the waveguide part. The laser gas passing through the respective discharge area 5, 5' are excited by obtaining energy from the microwave, and the laser gas becomes to a resonation state in an optical resonator formed by the reflector 6 and the partial reflector 7. Laser oscillation is generated in the optical resonator formed in the discharge tube 1, and the generated laser beam 8 is output through the partial reflector 7.

Other operation, function and technical advantages, of course including the function of the gas flow rectifier 14, are similar to those of the first embodiment, and the descriptions of operation function and advantages on the first embodiment similarly apply with necessary modification.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A gas laser oscillator comprising:
   a discharge tube;
   a gas circulation system connected to said discharge tube for circulating a gas in said discharge tube;
   means for applying microwave power to said discharge tube to excite said gas, wherein an annular discharge region is defined in said discharge tube by exciting said gas using said microwave power;
   a reflector provided at one end of said discharge tube;
   a partial reflector provided at another end of said discharge tube;
   means for providing said gas with a velocity vector having a component in a radial direction on a transverse crosssection plane which is perpendicular to an axis of said discharge tube.

2. A gas laser oscillator in accordance with claim 1, wherein said component in said radial direction which is represented as Vr is selected so as to satisfy an equation $Vr > a/Tm$, where a is an inner diameter of said discharge tube, and Trn is a natural relaxation period of excitation of a laser medium.

3. A gas laser oscillator in accordance with claim 1, wherein said microwave power is fed to said discharge tube by a waveguide coupled to said discharge tube.

4. A gas laser oscillator in accordance with claim 3, wherein said component in said radial direction which is represented as Vr is selected so as to satisfy an equation Vr>a/Trn, where a is an inner diameter of said discharge tube, and Trn is a natural relaxation period of excitation level of a laser medium.

5. A gas laser oscillator in accordance with one of claims 1 through 4, wherein said microwave power has a frequency of 2.45 GHz.

6. A gas laser oscillator in accordance with one of claims 1 through 4, wherein said means for providing said gas with a velocity vector having a component in said radial direction comprises a plurality of slit shaped gas flow paths, said slit shaped gas flow paths being located substantially parallel to said axis of said discharge tube.

7. A gas laser oscillator in accordance with claim 1, wherein said means for providing said gas with a velocity vector having a component in said radial direction is a pipe which is connected to an end of said discharge tube and having a plurality of slits which are substantially parallel to said axis of said discharge tube, said slits being defined in a plane located at a predetermined angle with respect to a plane including said axis of said discharge tube, said means for providing said gas with a velocity vector having a component in said radial direction being enclosed in an end chamber located at each end of said discharge tube and connected through said pipe to a gas flow blower of said gas circulation system.

* * * * *